(12) United States Patent
Ding et al.

(10) Patent No.: US 11,302,198 B2
(45) Date of Patent: *Apr. 12, 2022

(54) SYSTEM AND METHOD FOR CAMERA OR SENSOR-BASED PARKING SPOT DETECTION AND IDENTIFICATION

(71) Applicant: Volvo Car Corporation, Gothenburg (SE)

(72) Inventors: Sihao Ding, Sunnyvale, CA (US); Andreas Wallin, Gothenburg (SE)

(73) Assignee: Volvo Car Corporation, Gothenburg (SE)

( * ) Notice: Subject to any disclaimer, the term of this patent is extended or adjusted under 35 U.S.C. 154(b) by 0 days.

This patent is subject to a terminal disclaimer.

(21) Appl. No.: 16/932,931

(22) Filed: Jul. 20, 2020

(65) Prior Publication Data

US 2020/0349847 A1 Nov. 5, 2020

Related U.S. Application Data

(63) Continuation of application No. 16/129,871, filed on Sep. 13, 2018, now Pat. No. 10,720,058.

(51) Int. Cl.
*G08G 1/14* (2006.01)
*G08G 1/16* (2006.01)
(Continued)

(52) U.S. Cl.
CPC .......... *G08G 1/168* (2013.01); *B62D 15/0275* (2013.01); *G06K 9/00812* (2013.01);
(Continued)

(58) Field of Classification Search
CPC ....... H04L 67/12; H04L 67/10; H04L 67/306; H04L 51/02; H04L 63/0236; H04L 63/0428; H04L 63/102; H04L 67/26; H04L 67/34; H04L 67/025; H04L 67/38; H04L 67/30; G06Q 50/30; G06Q 10/20; G06Q 10/00; G06Q 10/02; G06Q 30/00; G06Q 30/012; G06Q 30/0265; G06Q 30/0633; G06Q 30/0639; G06Q 30/0645;
(Continued)

(56) References Cited

U.S. PATENT DOCUMENTS 9,260,090 B2  2/2016  Toledo et al.
9,449,512 B2  9/2016  Zafiroglu et al.
(Continued)

OTHER PUBLICATIONS

Jan. 28, 2020 European Search Report issued on International Application No. 19196514.

*Primary Examiner* — Daniel Previl
(74) *Attorney, Agent, or Firm* — Clements Bernard Walker; Christopher L. Bernard

(57) ABSTRACT

An on-board vehicle system and method for camera or sensor-based parking spot detection and identification is provided. This system and method utilizes a standard front (or side or rear) camera or sensor image to detect and identify one or more parking spots at a distance via vector or like representation using a deep neural network trained with data annotated using an annotation tool, without first transforming the standard camera or sensor image(s) to a bird's-eye-view (BEV) or the like. The system and method can be incorporated in a driver-assist (DA) or autonomous driving (AD) system.

20 Claims, 9 Drawing Sheets

(51) Int. Cl.
*B62D 15/02* (2006.01)
*G06K 9/00* (2022.01)

(52) U.S. Cl.
CPC ... *B60R 2300/607* (2013.01); *B60R 2300/806* (2013.01); *G06T 2207/30264* (2013.01)

(58) Field of Classification Search
CPC ............. G06Q 30/0641; G06Q 20/308; G06Q 20/321; G06Q 20/384; G06Q 20/386; G06Q 30/0266; G06Q 10/047; G06Q 10/10; G06Q 10/1093; G06Q 30/06; G06Q 1/52; G06Q 9/00; B60R 25/00; B60R 25/1004; B60R 11/04; B60R 25/01; B60R 25/102; B60R 25/20; B60R 25/2081; B60R 25/25; B60R 25/257; B60R 2300/806; B60R 2300/30; B60R 2300/404; B60R 2300/8093; B60R 2300/607; G01C 21/26; G01C 21/3484; G01C 21/362; G01C 21/365; G01C 21/3667; G01C 21/3691; G01C 21/3697; G05D 23/1917; G05D 1/001; G05D 1/021; G05D 1/0276; G05D 1/0231; G05D 1/0278; G05D 2201/0213; G06F 16/25; G06F 16/583; G06F 16/951; G06F 21/00; G06F 21/31; G06F 21/32; G06F 3/017; G06F 3/0488; G06F 16/183; G06F 16/24575; G06F 16/252; G06F 2203/04803; G06F 3/013; G06F 3/0481; G06F 3/0482; G06F 3/04842; G06F 3/04886; G06F 3/0622; G06F 3/0637; G06F 3/0673; G06F 9/451; G06K 2009/00939; G06K 9/00255; G06K 9/00268; G06K 9/00355; G06K 9/00832; G06K 9/00838; G06K 9/00221; G06K 9/00288; G06K 9/00335; G06K 9/00805; G06K 9/00812; G06K 9/00845; G08B 13/19647; G08B 21/06; G08B 25/016; G08B 29/188; G08B 21/0205; G08B 21/18; G08G 1/096725; G08G 1/096741; G08G 1/096775; G08G 1/01; G08G 1/07; G08G 1/0968; G08G 1/096805; G08G 1/096811; G08G 1/096844; G08G 1/164; G08G 1/207; G08G 1/165; G08G 1/166; G08G 1/167; G08G 1/0112; G08G 1/04; G08G 1/143; G08G 1/168; G08G 1/0967; G08G 1/141; G08G 1/20; H04N 21/41422; H04N 7/181; H04N 21/2225; H04N 21/2265; H04N 21/2393; H04N 21/25816; H04N 21/43615; H04N 21/43637; H04N 21/454; H04N 21/6408; H04N 21/64322; H04N 7/483; H04N 7/142; H04N 7/147; H04N 7/157; H04W 12/06; H04W 12/088; H04W 12/68; H04W 36/34; H04W 48/04; H04W 4/12; H04W 4/21; H04W 4/40; H04W 4/60; H04W 6/11; H04W 84/005; H04W 4/48; H04W 76/11; H04W 36/0005; H04W 4/021; H04W 4/30; H04W 4/70; H04W 4/80; H04W 76/19; H04W 84/18; H04W 4/46; H04W 12/068; H04W 12/084; H04W 4/024; H04W 4/44; B60W 50/14; B60W 2050/0067; B60W 2050/0085; B60W 50/085; B60W 50/10; B60W 10/20; B60W 2554/00; B60W 10/06; B60W 10/184; B60W 2420/42; B60W 2520/10; B60W 2554/4041; B60W 2554/801; B60W 2554/803; B60W 2554/804; B60W 2720/10; B60W 30/12; B60W 30/16; B60W 30/06; B60W 2420/403; B60W 10/04; B60W 10/10; B60W 10/18; B60W 2050/0064; B60W 2050/0292; B60W 2420/52; B60W 2420/54; B60W 2556/45; B60W 2710/0605; B60W 2710/10; B60W 2710/18; B60W 2710/20; B60W 2756/10; B60W 50/029; G07C 5/08; G07C 5/02; G07C 5/0825; G07C 5/0833; G07C 9/00563; G07C 5/008; G07C 5/0841; A61B 2503/04; A61B 5/0077; A61B 5/4809; A61B 5/6808; A61B 5/7405; A61B 5/742; A61B 7/04; B60C 1/00; B60C 1/00742; B60K 2370/11; B60K 2370/146; B60K 2370/15; B60K 2370/193; B60K 2370/52; B60K 35/00; B60N 2/0244; G01S 19/42; G01S 13/04; G01S 13/931; G01S 19/13; G01S 19/14; G01S 2013/9314; G01S 2013/9322; G01S 2013/9323; G01S 2013/9324; G02B 27/0093; G09G 2380/10; G09G 5/37; H05K 999/00; H05K 999/99; Y02A 90/10; B62D 15/027; B62D 15/0285; B62D 15/0275; B62D 1/00; G06T 19/006; G06T 2207/30264; H04B 1/3822

USPC ......... 370/932.2, 428, 438, 457.3, 464, 466, 370/517, 525, 539.13, 539.22, 539.26

See application file for complete search history.

(56) References Cited

U.S. PATENT DOCUMENTS

| | | | |
|---|---|---|---|
| 9,696,420 B2 | 7/2017 | Shaffer et al. | |
| 9,944,282 B1 | 4/2018 | Fields et al. | |
| 10,025,317 B2 | 7/2018 | Batur et al. | |
| 10,720,058 B2* | 7/2020 | Ding | G06K 9/00812 |
| 2008/0266396 A1* | 10/2008 | Stein | H04N 7/183 348/148 |
| 2011/0080304 A1 | 4/2011 | Toledo et al. | |
| 2015/0279210 A1* | 10/2015 | Zafiroglu | G08G 1/065 340/932.2 |
| 2016/0231133 A1* | 8/2016 | Johnson | B60R 25/102 |
| 2017/0132482 A1* | 5/2017 | Kim | B60K 35/00 |
| 2017/0267233 A1 | 9/2017 | Minster et al. | |
| 2017/0329346 A1 | 11/2017 | Latotzki | |
| 2018/0025640 A1 | 1/2018 | Micks et al. | |
| 2018/0056872 A1 | 3/2018 | Taylor et al. | |
| 2018/0098564 A1 | 3/2018 | Tanigawa et al. | |
| 2018/0095474 A1 | 4/2018 | Batur et al. | |
| 2018/0201256 A1* | 7/2018 | Tseng | G05D 1/0212 |

* cited by examiner

| Stage | Filters | Size | Repetition |
|---|---|---|---|
| Feature Extraction ||||
| Conv1 | 64 | 7 X 7 (stride 2) | X 1 |
| MaxPool | | 3 X 3 (stride 2) | X 1 |
| Conv2 | 64<br>64<br>256 | 1 X 1 (stride 2 in first repetition)<br>3 X 3<br>1 X 1 | X 3 |
| Conv3 | 128<br>128<br>512 | 1 X 1 (stride 2 in first repetition)<br>3 X 3<br>1 X 1 | X 4 |
| Conv4 | 256<br>256<br>1024 | 1 X 1 (stride 2 in first repetition)<br>3 X 3<br>1 X 1 | X 6 |
| Conv5 | 512<br>512<br>2048 | 1 X 1 (stride 2 in first repetition)<br>3 X 3<br>1 X 1 | X 3 |
| Feature Pyramid ||||
| P5 | 128 | 1 X 1 | X 1 |
| P6 | 128 | 3 X 3 (stride 2) | X 1 |
| P4, P3, P2 | 128<br>128 | 1 X 1<br>3 X 3 | X 3 |
| Output Heads (concatenate on each of P2-P6) ||||
| Classify | 128<br>128<br>128<br>k .a | 3 X 3<br>3 X 3<br>3 X 3<br>3 X 3 | X 1 |
| Regress | 128<br>128<br>128<br>d .a | 3 X 3<br>3 X 3<br>3 X 3<br>3 X 3 | X 1 |

FIG. 5

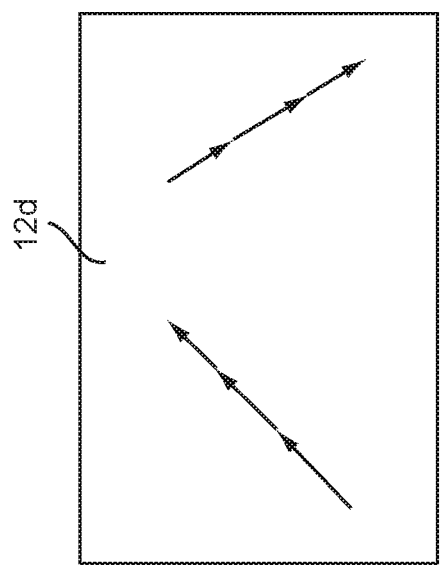
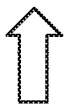
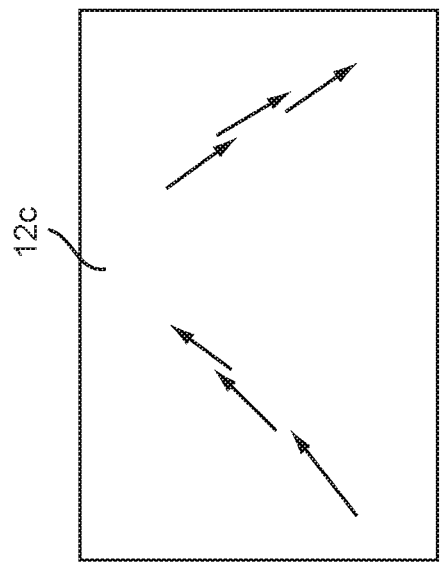
FIG. 6

SYSTEM AND METHOD FOR CAMERA OR SENSOR-BASED PARKING SPOT DETECTION AND IDENTIFICATION

CROSS-REFERENCE TO RELATED APPLICATION

The present disclosure is a continuation (CON) of co-pending U.S. patent application Ser. No. 16/129,871, filed on Sep. 13, 2018, and entitled "SYSTEM AND METHOD FOR CAMERA OR SENSOR-BASED PARKING SPOT DETECTION AND IDENTIFICATION," the contents of which are incorporated in full by reference herein.

TECHNICAL FIELD

The present disclosure relates generally to the automotive field. More specifically, the present disclosure relates to an on-board vehicle system and method for camera or sensor-based parking spot detection and identification. This system and method utilizes a front (or side or rear) camera or sensor image to detect and identify one or more parking spots at a distance via vector or like representation using a deep neural network trained with data annotated using an annotation tool, without first transforming the camera or sensor image(s) to a bird's-eye-view (BEV) or the like. The system and method can be incorporated in a driver-assist (DA) or autonomous driving (AD) system.

BACKGROUND

A variety of conventional on-board vehicle parking spot detection systems are known to those of ordinary skill in the art. Most of these parking spot detection systems utilize one or more proximity sensors, e.g. ultra-sonic sensors or the like, mounted on a vehicle to detect an empty parking spot between two occupied parking spots. Such detection is limited by the close range of operation of such sensors, typically on the order of a few meters. Further, such detection requires the presence of structures or obstacles, e.g. other vehicles, on either side of an empty parking spot to be detected. If an empty parking "slot" is not created by physical references, then detection fails. This limits the usefulness of these proximity sensor-based parking spot detection systems, even when coupled with various relatively slow, sub-optimal, and potentially unsafe planning-based automatic parking systems that provide maps of potential and/or available parking spots through the cloud or other vehicle-to-vehicle communication means. This limits the usefulness of the proximity sensor-based parking spot detection systems in DA and AD systems.

Parking spot detection systems that utilize BEV camera images generate the BEV from multiple, e.g. four, fisheye camera images that are warped to be parallel to the ground and stitched together to create a view of a vehicle from above, including the nearby surroundings. Lines and obstacles related to parking spots can then be segmented from these BEV camera images. Again, however, such detection is limited in terms of range, typically to a few meters, and the BEV camera images tend to be undesirably distorted. This limits the usefulness of these BEV camera image-based parking spot detection systems in DA and AD systems.

Thus, what is still needed in the art is a parking spot detection system that utilizes a standard front (or side or rear) camera or sensor image, such that parking spot detection and identification is enhanced and may be carried out at a distance, whether the parking spot is empty, full, surrounded by full parking spots, surrounded by empty parking spots, etc. Such a parking spot detection system is provided by the present disclosure.

SUMMARY

In various aspects, the present disclosure provides an on-board vehicle system and method for camera or sensor-based parking spot detection and identification. This system and method utilizes a front (or side or rear) camera or sensor image to detect and identify one or more parking spots at a distance via vector or like representation using a deep neural network trained with data annotated using an annotation tool, without first transforming the camera or sensor image(s) to a BEV or the like. The system and method can form an integral part of a DA or AD system.

The vector or like representation of the present disclosure is a compact representation that is encoded with the position, size, and orientation of a detected parking spot or spots, as well as entrance direction and type identification (vacant, occupied, handicapped, emergency, loading zone, etc.). It will be apparent to those of ordinary skill in the art that such vector or like representation can be readily extended to spaces other than parking spots.

The deep neural network of the present disclosure used to detect and identify parking spots from standard camera or sensor images and generate vectors or the like can, broadly to narrowly, be classified as an artificial intelligence (AI) network, a machine learning (ML) network, a deep learning (DL) network, a deep neural network (DNN), a convolutional neural network (CNN), etc. The input to the network is the camera or sensor image (or images) from the vehicle camera or sensor (or cameras or sensors), and the output is encoded vector(s) or the like representing detected and identified parking spot(s).

The deep neural network is trained using a plurality of annotated training images generated using an annotation tool. This annotation tool allows an annotator to select points on the training images, corresponding to parking spot points of interest, segment the training images, annotate the training images, and save the results as a json file or the like.

The base algorithm of the present disclosure is primarily focused on the local correctness of individual vectors or the like. An extended algorithm may be implemented that adds global awareness to the base algorithm. This extended algorithm ensures that all generated vectors or the like are smooth and globally consistent, just as the underlying parking spots are smooth and globally consistent. In other words, the vectors or the like meet at consistent points, with consistent lines and angles, thereby more accurately representing the underlying physical reality. The extended algorithm may utilize a generative approach, for example, the family of variational autoencoders (VAE), or the family of Generative Adversarial Networks (GAN, cGAN, DCGAN, WGAN, etc.).

As the detected and identified parking spots are located at readily-ascertainable image coordinates, they can be easily mapped to a BEV or the like, providing ground coordinates, as necessary, for DA or AD applications. These image coordinates can also be overlaid on any variety of camera or sensor images to provide an augmented reality tool for assisting a driver in finding vacant parking spots, for example.

In one specific aspect, the present disclosure provides a system for detecting and identifying a parking spot, including: a camera or sensor operable for obtaining an image including a parking spot, wherein the camera or sensor includes one or more of a front camera or sensor, a side camera or sensor, and a rear camera or sensor of a vehicle, and wherein the image includes one or more of a front image, a side image, and a rear image; and a processor executing an algorithm operable for generating a vector representation of the parking spot, wherein the vector representation includes information related to one or more of a location, a size, an orientation, and a classification of the parking spot. Optionally, the camera or sensor includes multiple of the front camera or sensor, the side camera or sensor and the rear camera or sensor, and wherein the image includes multiple of the front image, the side image, and the rear image stitched together. The processor is disposed one of on-board the vehicle and remote from the vehicle in a network cloud. The algorithm is operable for executing an image pre-processing stage, a network operations stage, and a post-processing stage that comprises a decoding step that interprets output of the network operations stage and a vector-based non-maximum suppression step. The network is an artificial intelligence network trained using a plurality of training images that are annotated using an annotation tool. The annotation tool is operable for receiving selected points of interest on the plurality of images from an annotator, segmenting the training images based on the selected points of interest, annotating the plurality of training images, and saving the results as a json file or the like, wherein the selected points of interest utilize one or more classes of markers, and wherein the plurality of training images are annotated using one or more classes of representations based on the one or more classes of markers. Optionally, the algorithm utilizes a generative algorithm operable for modifying the vector representation such that it is consistent with surrounding vector representations generated from the image. The classification of the parking spot includes one or more of unoccupied, occupied, and parking spot type. Optionally, the system further includes a display operable for displaying the vector representation to a driver of the vehicle overlaid on one of the image and another image. Optionally, the vector representation is communicated to and used by one or more of a driver-assist system and an autonomous driving system of the vehicle to maneuver the vehicle into the parking spot when the vector representation indicates that the parking spot is unoccupied. The camera or sensor is operable for obtaining the image at least 30 meters and up to 50 meters or more away. Optionally, the system is used in conjunction with one or more other sensors or systems of the vehicle operable for assessing the position of the vehicle in the surrounding environment.

In another specific aspect, the present disclosure provides a method for detecting and identifying a parking spot, including: obtaining an image including a parking spot using a camera or sensor, wherein the camera or sensor includes one or more of a front camera or sensor, a side camera or sensor, and a rear camera or sensor of a vehicle, and wherein the image includes one or more of a front image, a side image, and a rear image; and generating a vector representation of the parking spot using a processor executing an algorithm, wherein the vector representation includes information related to one or more of a location, a size, an orientation, and a classification of the parking spot. Optionally, the camera or sensor includes multiple of the front camera or sensor, the side camera or sensor and the rear camera or sensor, and wherein the image includes multiple of the front image, the side image, and the rear image stitched together. The processor is disposed one of on-board the vehicle and remote from the vehicle in a network cloud. The algorithm is operable for executing an image pre-processing stage, a network operations stage, and a post-processing stage that comprises a decoding step that interprets output of the network operations stage and a vector-based non-maximum suppression step. The network is an artificial intelligence network trained using a plurality of training images that are annotated using an annotation tool. The annotation tool is operable for receiving selected points of interest on the plurality of images from an annotator, segmenting the training images based on the selected points of interest, annotating the plurality of training images, and saving the results as a json file or the like, wherein the selected points of interest utilize one or more classes of markers, and wherein the plurality of training images are annotated using one or more classes of representations based on the one or more classes of markers. Optionally, the algorithm utilizes a generative algorithm operable for modifying the vector representation such that it is consistent with surrounding vector representations generated from the image. The classification of the parking spot includes one or more of unoccupied, occupied, and parking spot type. Optionally, the method further includes displaying the vector representation to a driver of the vehicle overlaid on one of the image and another image using a display. Optionally, the vector representation is communicated to and used by one or more of a driver-assist system and an autonomous driving system of the vehicle to maneuver the vehicle into the parking spot when the vector representation indicates that the parking spot is unoccupied. The camera or sensor is operable for obtaining the image at least 30 meters and up to 50 meters or more away. Optionally, the method is used in conjunction with one or more other sensors or systems of the vehicle operable for assessing the position of the vehicle in the surrounding environment.

In a further specific aspect, the present disclosure provides a vehicle including a system for detecting and identifying a parking spot, the vehicle including: a camera or sensor operable for obtaining an image including a parking spot, wherein the camera or sensor includes one or more of a front camera or sensor, a side camera or sensor, and a rear camera or sensor of a vehicle, and wherein the image includes one or more of a front image, a side image, and a rear image; one of an on-board processor and a communications link to a remote processor executing an algorithm operable for generating a vector representation of the parking spot, wherein the vector representation includes information related to one or more of a location, a size, an orientation, and a classification of the parking spot; and a display operable for displaying the vector representation to a driver of the vehicle overlaid on one of the image and another image. Optionally, the camera or sensor includes multiple of the front camera or sensor, the side camera or sensor and the rear camera or sensor, and wherein the image includes multiple of the front image, the side image, and the rear image stitched together. The algorithm includes an artificial intelligence network trained using a plurality of training images that are annotated using an annotation tool, and, optionally, the algorithm utilizes a generative algorithm operable for modifying the vector representation such that it is consistent with surrounding vector representations generated from the image. Optionally, the vehicle further includes one or more of a driver-assist system and an autonomous driving system operable for receiving the vector representation and maneuvering the vehicle into the parking spot when the vector representation indicates that the parking spot is unoccupied.

BRIEF DESCRIPTION OF THE DRAWINGS

The present disclosure is illustrated and described herein with reference to the various drawings, in which like reference numbers are used to denote like system components/method steps, as appropriate, and in which:

FIG. 5 is a table illustrating one exemplary network structure of the DNN of the present disclosure;

FIG. 6 is a schematic diagram illustrating the operation of the enhanced DNN of the present disclosure;

DESCRIPTION OF EMBODIMENTS

Again, in various aspects, the present disclosure provides an on-board vehicle system and method for camera or sensor-based parking spot detection and identification. This system and method utilizes a front (or side or rear) camera or sensor image to detect and identify one or more parking spots at a distance via vector representation using a deep neural network trained with data annotated using an annotation tool, without first transforming the camera or sensor image(s) to a BEV or the like. The system and method can form an integral part of a DA or AD system.

The vector representation of the present disclosure is a compact representation that is encoded with the position, size, and orientation of a detected parking spot or spots, as well as entrance direction and type identification (vacant, occupied, handicapped, emergency, loading zone, etc.). It will be apparent to those of ordinary skill in the art that such vector representation can be any time of directional representation and can be readily extended to defined spaces other than parking spots.

Figure 1:
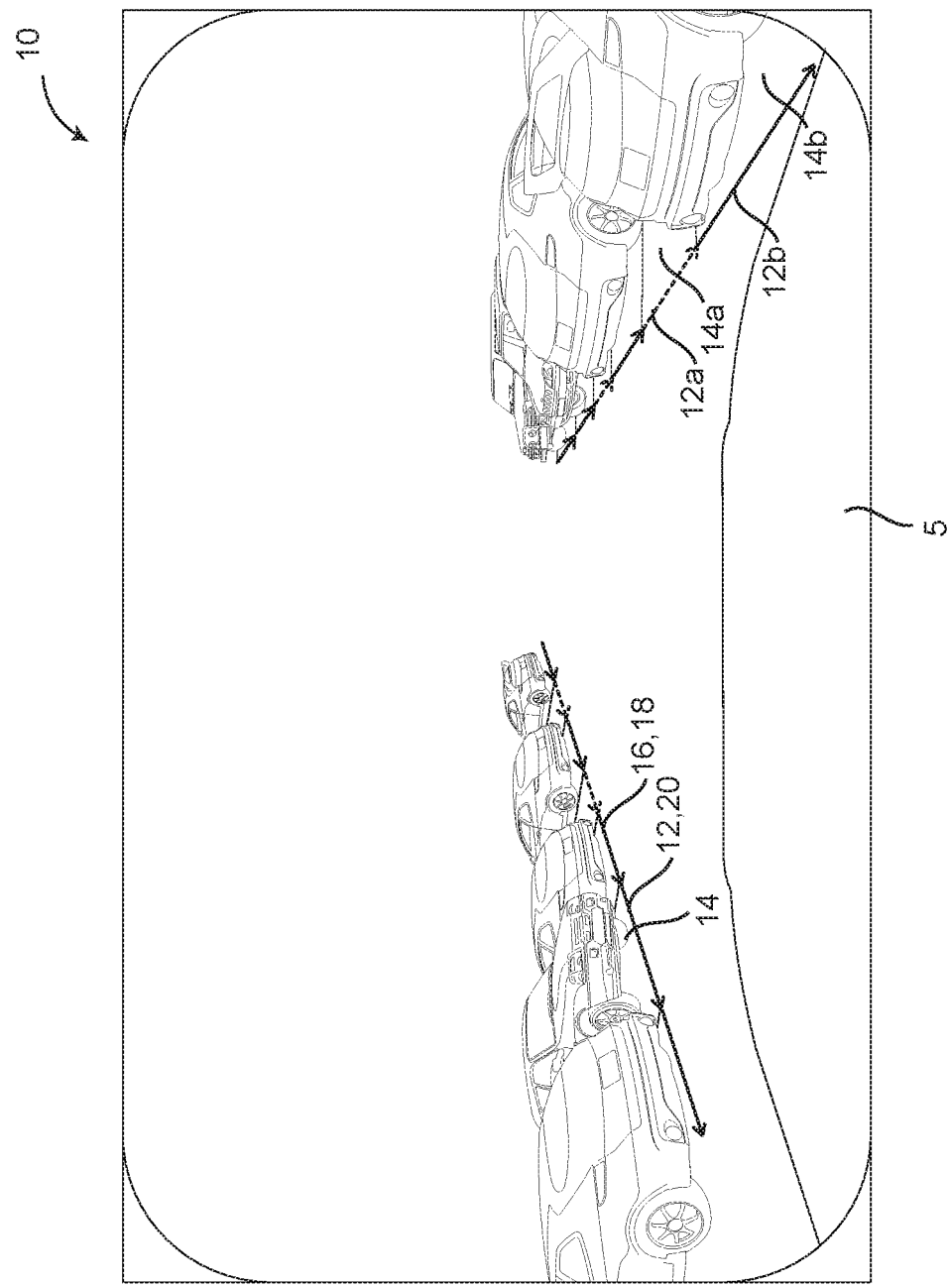
FIG. 1 is a front camera image illustrating the parking spot vector representation of the present disclosure.
Figure 2:
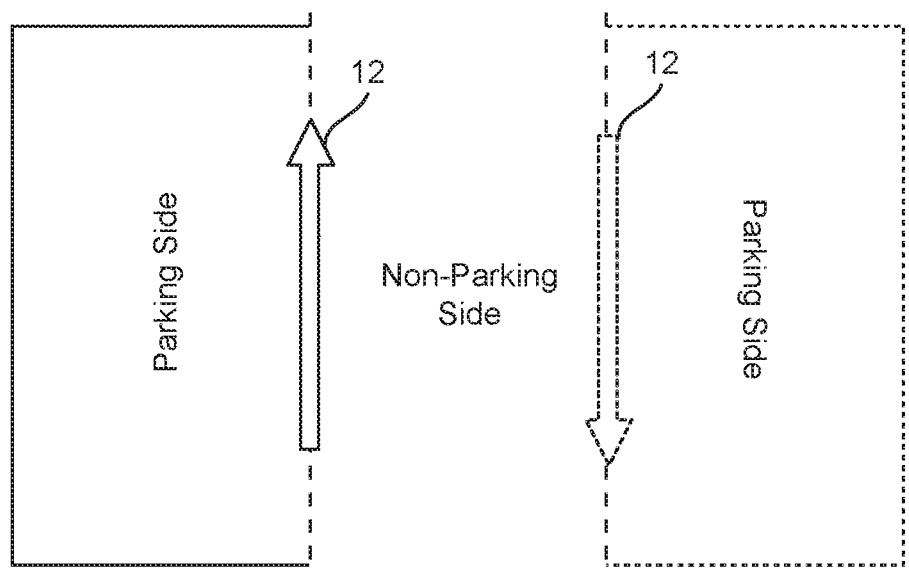
FIG. 2 is a schematic diagram illustrating the directionality of the parking spot vector representation of the present disclosure.
Figure 3:
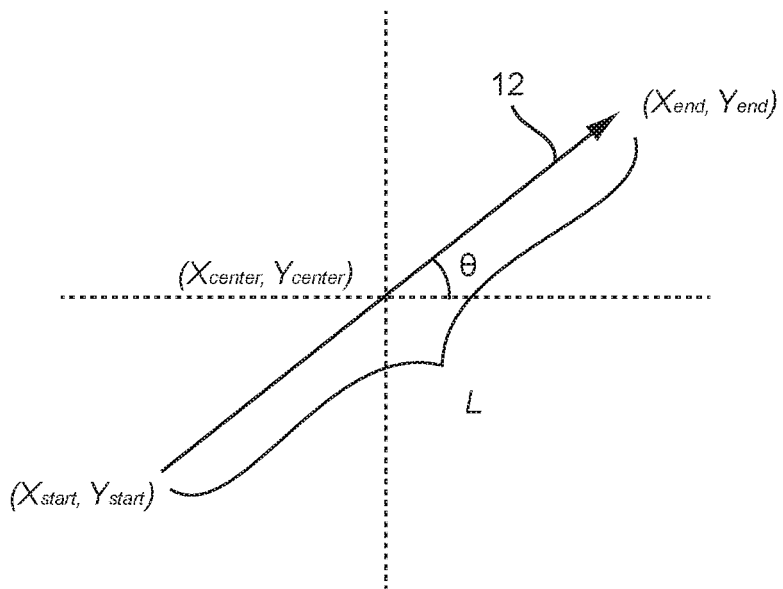
FIG. 3 is a schematic diagram illustrating one exemplary convention for orienting the parking spot vector representation of the present disclosure.

Referring now specifically to FIG. 1, a standard front vehicle camera image 10 is shown, with overlaid vector representations 12 of each parking spot 14 provided. In general, these vector representations 12 connect the points 16 associated with each front corner 18 of the corresponding parking spot 14, highlighting the entrance 20 of each parking spot 14. A first type of parking spot 14a, such as an unoccupied parking spot, a standard parking spot, etc., may be indicated by a first color or texture vector representation 12a, while a second type of parking spot 14b, such as an occupied parking spot, a handicapped/emergency parking spot, etc., may be indicated by a second color or texture vector representation 12b. Thus, the vector representations 12 are encoded with classification information related to the parking spots 14, in addition to position, size, and orientation information. In this exemplary embodiment, the directional arrow orientation of each vector representation 12 indicates which side of the vehicle 5 the entrance 20 of the corresponding parking spot 14 is present on, with generally upward-oriented arrows indicating an entrance 20 on the left side of the vehicle 5 from the driver's perspective and generally downward-oriented arrows indicating an entrance 20 on the right side of the vehicle 5 from the driver's perspective. This is shown in FIG. 2. As shown in FIG. 3, 90-degree counter-clockwise rotation of the vector 12 points to the associated parking spot in the ground plane, for example, thereby providing a formally defined convention with vector classification encoding [0,1,0, . . . ,0] or vector regression encoding $[x_{start}, y_{start}, x_{end}, y_{end}]$, $[x_{center}, y_{center}, l, \Theta]$, or $[x_{center}, y_{center}, l, \sin\Theta, \cos\Theta]$. It will be readily apparent to those of ordinary skill in the art that other representations may be used equally, provided that they are capable of communicating the same or similar information.

As described herein above, most conventional on-board vehicle parking spot detection systems (which the parking spot detection and identification system of the present disclosure may complement) utilize one or more proximity sensors, e.g. ultra-sonic sensors, radar sensors, or the like, mounted on a vehicle to detect an empty parking spot between two occupied parking spots. Such detection is limited by the close range of operation of such sensors, typically on the order of a few meters. This is remedied by the parking spot detection and identification system of the present disclosure, which can "see" a considerable distance in front of, next to, or behind the vehicle (on the order of tens of meters). Thus, more parking spots can be "covered" per time unit, allowing for behavioral planning before a parking spot has been passed, for example. Further, such conventional detection requires the presence of structures or obstacles, e.g. other vehicles, on either side of an empty parking spot to be detected. If an empty parking "slot" is not created by physical references, then detection fails. This is again remedied by the parking spot detection and identification system of the present disclosure, which is not constrained by the presence of structures or obstacles on either side of an empty parking spot to be detected. The parking spot detection and identification system detects and identifies the parking spots themselves, in large part, from only a visible line or other marking. This enhances the usefulness of the parking spot detection and identification system in DA and AD systems.

Similarly, conventional parking spot detection systems that utilize BEV camera images generate the BEV from multiple, e.g. four, fisheye camera images that are warped to be parallel to the ground and stitched together to create a view of a vehicle from above, including the nearby surroundings. Lines and obstacles related to parking spots are segmented from these BEV camera images. Such detection is limited in terms of range, typically to a few meters, and the BEV camera images are typically undesirably distorted. This also limits the usefulness of these BEV camera image-based parking spot detection systems in DA and AD systems. The parking spot detection and identification system of the present disclosure can "see" a considerable distance in front of, next to, or behind the vehicle (on the order of tens of meters). Further, the use of a front camera image takes full advantage of the presence of the vehicle headlights, in image acquisition at night, for example. This is not the case when using a BEV image.

Figure 4:
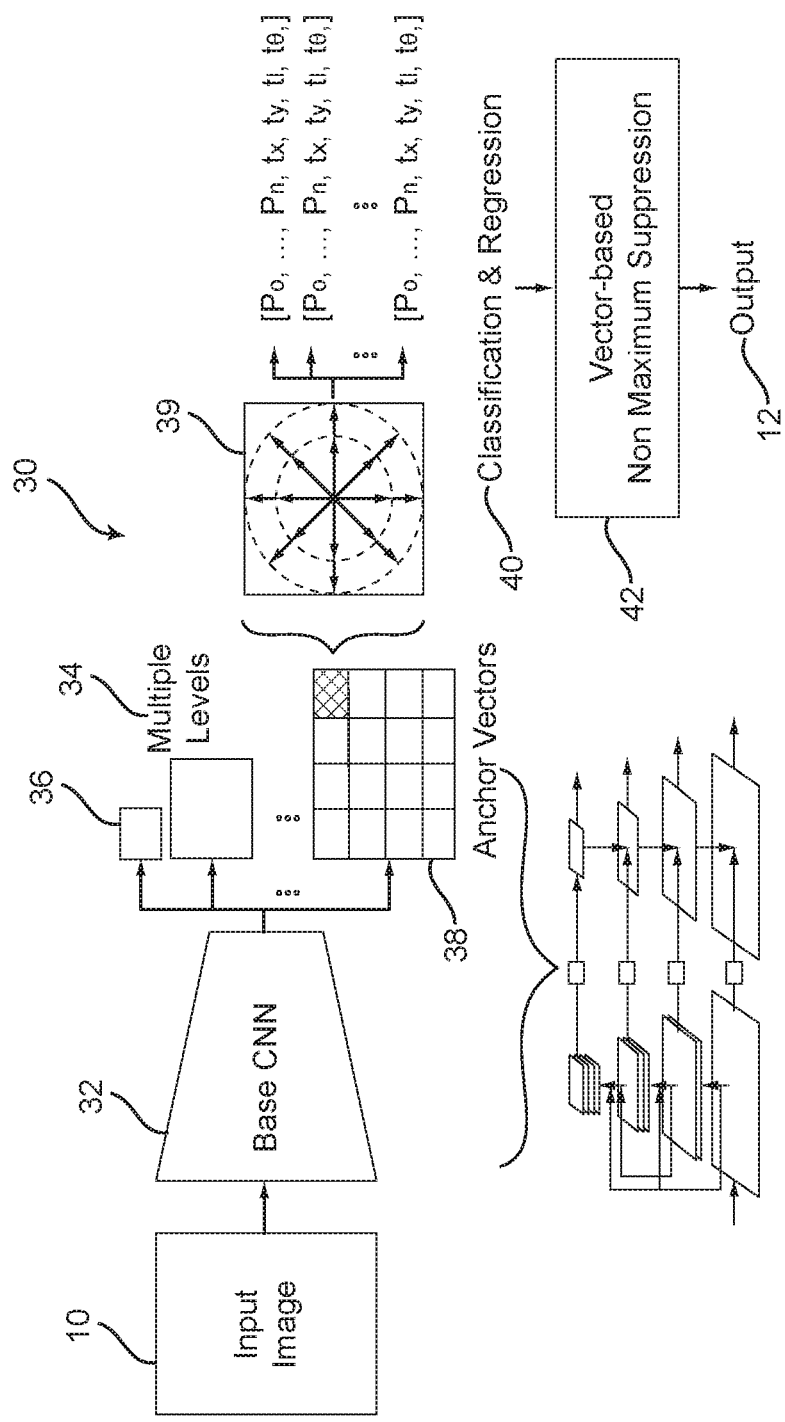
FIG. 4 is a schematic diagram illustrating one exemplary embodiment of the DNN of the present disclosure.

Referring now specifically to FIG. 4, the network 30 of the present disclosure used to detect and identify parking spots 14 (FIG. 1) from standard camera or sensor images 10 and generate vectors 12 can, broadly to narrowly, be classified as an AI network, a ML network, a DL network, a DNN, a CNN, etc. The input to the network 30 is the camera or sensor image (or images) 10 from the vehicle camera or sensor (or cameras or sensors), and the output is encoded vector(s) 12 representing detected and identified parking spot(s) 14. The input image 10 is provided to a base CNN 32 or the like that creatures feature pyramids 34 including multiple levels 36 and anchor vectors 38 [$p_0, \ldots, p_n, t_x, t_y, t_l, t_\theta$], as multiple vectors are implicated by a given parking spot 14. Classification and regression techniques 40 are then utilized, and vector-based non-maximum suppression 42 is performed to achieve the final output vector representation 12 for the given parking spot 14.

The whole pipeline can be divided into three stages: input pre-processing, network operations, and output post-processing.

The input pre-processing stage includes grabbing frame(s) from the camera(s) or sensor(s) and applying required input normalization to scale the pixel values to between −0.5 and 0.5 and provide zero (0) mean and unit (1) variance. The purpose of this stage is to allow for easier training of the following network 30 and to improve robustness as compared to input noise.

The network operations stage takes the processed input image(s) 10 as input and outputs the predicted vectors 12 encoded with classification and regression information. The network structure can be further divided into three parts: feature extraction, the feature pyramids 34, and output heads. The feature extraction part is composed of the base CNN 32 that is responsible for extracting useful features from the input image(s) 10. The feature pyramids 34 cast the extracted features into multi-scale features to achieve scale robustness. The output heads contain a classification head and a regression head. The classification head outputs the class information of predicted vectors, and the regression head outputs the position, direction, and size of the predicted vectors. For each layer in the feature pyramids 34, such pair of output heads is attached, which means that the prediction of vectors takes place at different scales so that vectors of all sizes can be detected and identified. The anchor vectors 38 are predefined vectors with various orientations and lengths. When a vector is sufficiently similar to an anchor vector 38, the anchor vector 38 is activated and assigned a score based on similarity. During training of the network 30, the anchor vectors 38 are assigned positive (activated) or negative (deactivated) status based on their similarity score with ground truth vectors derived from annotation. The similarity between two vectors is determined by a combination of center position, length, and direction of the two vectors. When the similarity score is higher than a predefined value, the anchor vectors 38 are given the label positive. When the similarity score is lower than a predefined value, the anchor vectors 38 are given the label negative. Potentially, when the two values are set differently, the anchor vectors 38 with a similarity score in between will be set to be ignored during the calculation of the loss. The training process involves iteratively updating the value of the parameters of the network 30 so that the loss (a value characterizing the prediction error) is small between the predicted vectors and the ground-truth vectors derived from annotation. The outputs are encoded so that each vector is a transformed version of an activated anchor vector 38. The [$p_0, \ldots, p_n$] encodes which class the vector belongs to. The [$t_x, t_y, t_l, t_\theta$] encodes how the vector is transformed from the anchor vector 38 using the following formulas:

$$t_x = \frac{b_x - a_x}{a_l},$$

$$t_y = \frac{b_y - a_y}{a_l},$$

$$t_l = \log\left(\frac{b_l}{a_l}\right),$$

$$t_\theta = b_\theta - a_\theta,$$

where a and b represent the anchor vector 38 and the vector to be encoded, respectively; subscripts x, y, l, and θ represent the horizontal and vertical coordinates of the center of the vector, the length of the vector, and the direction of the vector, respectively.

The output post-processing stage includes a decoding step that interprets the output of the network operations stage and a vector-based non-maximum suppression (NMS) step. The vector-based NMS step is specifically designed to operate on vectors, as opposed to bounding boxes for standard NMS. To do so, each vector is augmented into a circle 39 whose center is at the center of the vector (which is [$x_{center}, y_{center}$]), and the diameter is the length of the vector (l). The intersection-over-union (IoU) score of the circles 39 is then calculated to replace the IoU score used in a standard NMS. In practice, the circumscribed square of said circle 39 is used in place of the circle 39, for faster computation with little quality loss.

FIG. 5 is a table illustrating one exemplary network structure 44 of the DNN 30 of the present disclosure. Feature extraction incorporates a ResNet-like structure. Conv1, 2, ..., 5 represents convolution blocks. Each row in a convolution block contains the following layers, in sequence: 2D-convolution (Conv2D), batch normalization (BN), and rectified linear unit (ReLU). There are residual layers (i.e. skip connections) between convolution blocks. The feature pyramid 34 (FIG. 4) has 5 levels 36 (FIG. 4), each carrying further extracted feature information at corresponding scales. A pair of classification and regression heads is attached to each level 36 of the feature pyramid 34. Here, k is the number of classes, a is the number of anchor vectors per position, and d is the dimension of the vector regression encoding. Note, the network structure 44 may vary considerably, with this specific network structure 44 being exemplary only.

Figure 7:
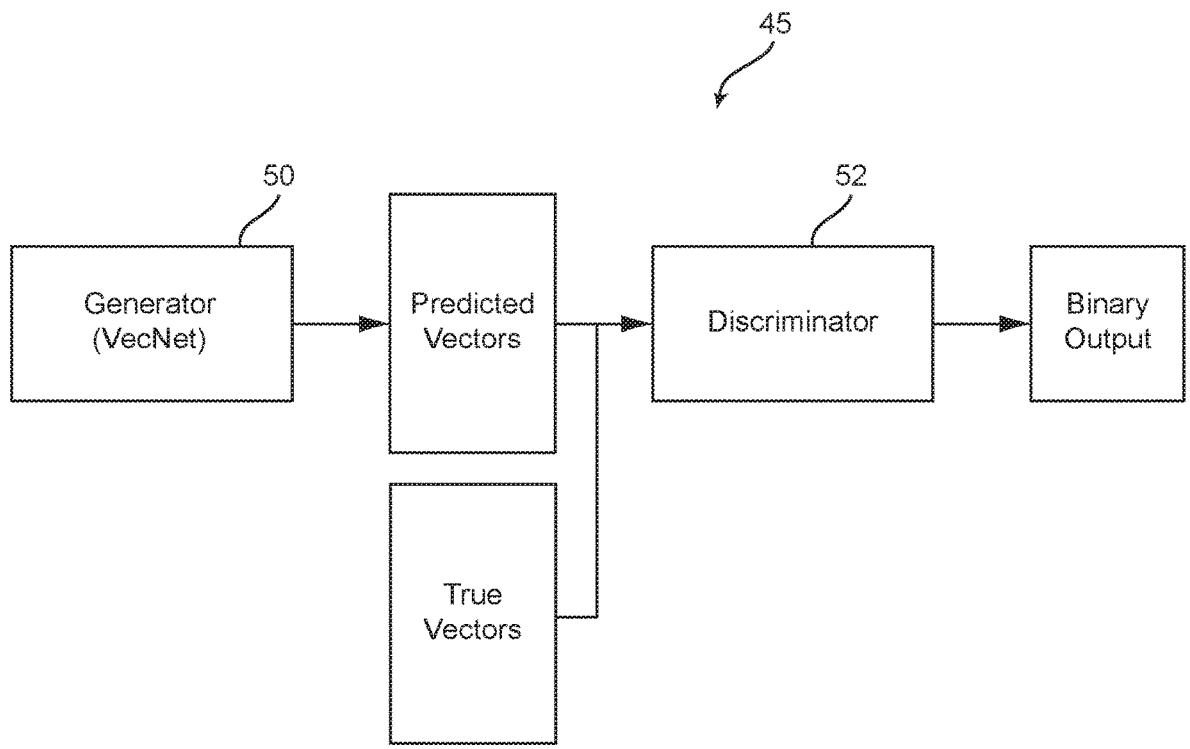
FIG. 7 is a schematic diagram illustrating one exemplary embodiment of the enhanced DNN of the present disclosure.

Referring now specifically to FIG. 6, the base algorithm of the present disclosure is primarily focused on the local correctness of individual vectors 12c. An extended algorithm may be implemented that adds global awareness to the base algorithm, providing globally "smoothed" vectors 12d. This extended algorithm ensures that all generated vectors 12d are globally consistent, just as the underlying parking spots 14 (FIG. 1) are globally consistent. In other words, the vectors 12d meet at consistent points, with consistent lines and angles, thereby more accurately representing the underlying physical reality. The extended algorithm may utilize a generative approach, for example, the family of variational autoencoders (VAE), or the family of Generative Adversarial Networks (GAN, cGAN, DCGAN, WGAN, etc.), collectively the GAN 45 (FIG. 7). The GAN 45 acts as a global constraint, and different types of GANs 45 may be used to overcome the instability of training.

Referring now specifically to FIG. 7, the GAN 45 is a generative model that can produce realistic samples from random vectors drawn from a known distribution. The GAN 45 consists of a generator 50 and a discriminator 52, both of which are usually implemented as DNNs. The training of the GAN 45 involves an adversarial game between the generator 50 and the discriminator 52. In this context, the generator 50 creates vectors that are intended to come from the same distribution as the vectors in the training data; the discriminator 52 tries to classify between vectors generated by the generator 50 (trying to assign score 0) and real vectors from the training data (trying to assign score 1). Thus, the network 30 (FIG. 4) now act as the generator 50 in the GAN framework. The discriminator 52 learns to distinguish between the vectors predicted by the network 30 and the annotated ground-truth vectors in the training data. By doing so, the GAN framework tries to enforce its generator 50 (i.e. the network 30) to generate vectors as realistic as the true vectors so that discriminator 52 is hard to distinguish. The loss function of the GAN 45 is binary cross entropy, and this loss is added to the original loss of the network 30 for back-propagation during training of the network 30. As shown in FIG. 6, in the beginning, the discriminator 52 (FIG. 7) will be able to tell that the left vectors are generated because the real vectors usually look like the ones on the right. As the training goes on, the generator 50 (FIG. 7) learns to generate vectors that are more realistic, and they look more and more natural and consistent, like the ones on the right. During deployment phase, only the generator 50, which is "tuned" by the GAN 45, is deployed. Overall computation is only increased in the training phase, not when the trained model is actually used. Thus, on-board time consumption is not increased by the presence of the GAN 45.

Figure 8:
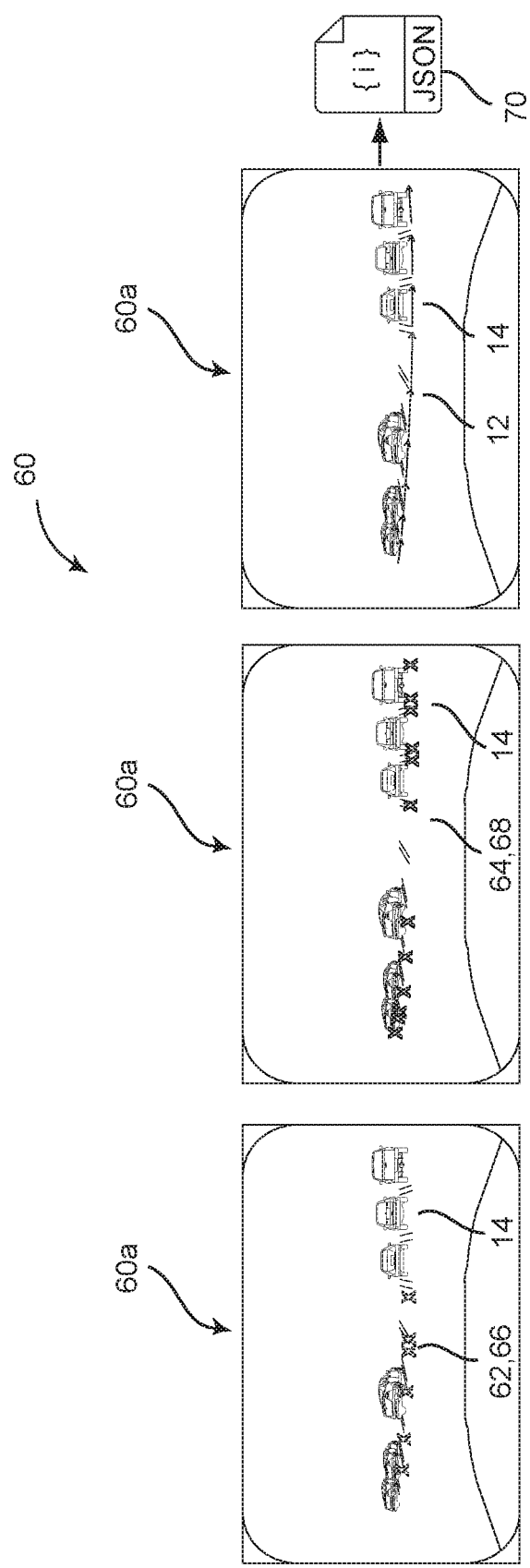
FIG. 8 is a series of front camera images illustrating the use of the annotation tool of the present disclosure.

Referring now specifically to FIG. 8, the network 30 (FIG. 4) is trained using a plurality of annotated training images 60b generated using an annotation tool 60. This annotation tool 60 allows an annotator to select points 62 and 64 on the training images 60a, corresponding to parking spot points of interest 66 and 68, segment the training images 60a, annotate the training images 60a, and save the results to a json file 70 or the like. In this specific example, a training image 60a is annotated with two vector classes, although it will be readily apparent to those of ordinary skill in the art that more could be utilized equally. First, entrance points 66 of various parking spots 14 are selected using a first class of markers 62 indicative of a first parking spot characteristic or characteristics (e.g. unoccupied, standard, etc.). Second, entrance points 68 of various parking spots 14 are selected using a second class of markers 64 indicative of a second parking spot characteristic or characteristics (e.g. occupied, handicapped, emergency, etc.). Third, encoded vector representations 12 are generated using the markers 62 and 64 and the training image 60b is saved as the json file 70 or the like for later use.

Figure 9:
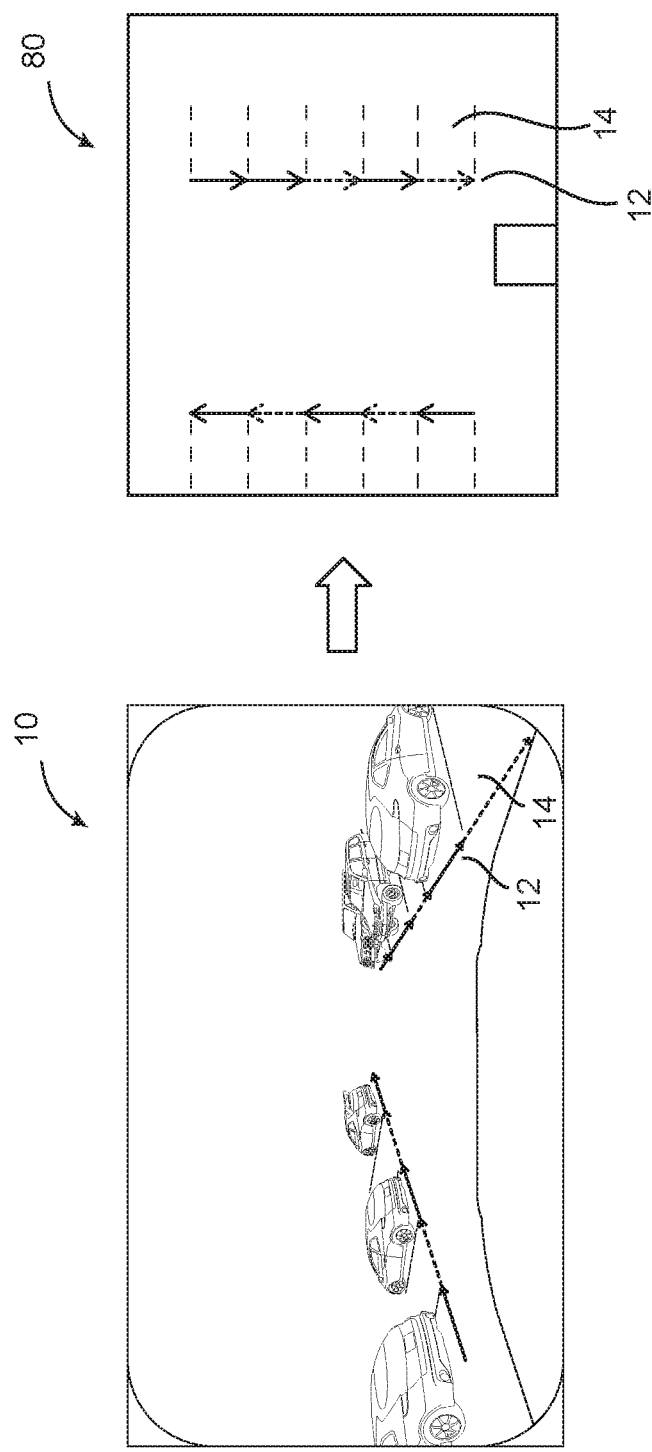
FIG. 9 is a series of images illustrating an overlay of the parking spot vector representation of the present disclosure on a BEV image or the like, such that a driver-assist function may be provided.

Referring now specifically to FIG. 9, as the detected and identified parking spots 14 are located at readily-ascertainable image coordinates, they can be easily mapped to a BEV 80 or the like, providing ground coordinates, as necessary, for DA or AD applications. These image coordinates can also be overlaid on any variety of camera images to provide an augmented reality tool for assisting a driver in finding vacant parking spots 14, for example.

Preferably, the software application/algorithm of the present disclosure is implemented as coded instructions stored in a memory and executed by a processor. The processor is a hardware device for executing such coded instructions. The processor can be any custom made or commercially available processor, a central processing unit (CPU), an auxiliary processor among several processors associated with the memory, a semiconductor-based microprocessor (in the form of a microchip or chip set), or generally any device for executing coded instructions. The processor is configured to execute software stored within the memory, to communicate data to and from the memory, and to generally control operations pursuant to the coded instructions. In an exemplary embodiment, the processor may include a mobile optimized processor, such as one optimized for power consumption and mobile applications. Input/output (I/O) interfaces can be used to receive user input and/or for providing system output. User input can be provided via, for example, a keypad, a touch screen, a scroll ball, a scroll bar, buttons, a voice-activation system, and/or the like. System output can be provided via a display device, such as a liquid crystal display (LCD), touch screen, and/or the like. The I/O interfaces can also include, for example, a serial port, a parallel port, a small computer system interface (SCSI), an infrared (IR) interface, a radio frequency (RF) interface, a universal serial bus (USB) interface, and/or the like. The I/O interfaces can include a graphical user interface (GUI) that enables the user to interact with the memory. Additionally, the I/O interfaces may further include an imaging device, i.e. the camera, a video camera, a sensor, etc.

The memory may include any of volatile memory elements (e.g., random access memory (RAM, such as DRAM, SRAM, SDRAM, etc.)), nonvolatile memory elements (e.g., ROM, hard drive, etc.), and combinations thereof. Moreover, the memory may incorporate electronic, magnetic, optical, and/or other types of storage media. Note that the memory may have a distributed architecture, where various components are situated remotely from one another, but can be accessed by the processor. The software in memory can include one or more software programs, each of which includes an ordered listing of executable instructions for implementing logical functions. The software in the memory includes a suitable operating system (O/S) and programs. The operating system essentially controls the execution of other computer programs, and provides scheduling, input-output control, file and data management, memory management, and communication control and related services. The programs may include various applications, add-ons, etc. configured to provide end user functionality. The programs can include an application or "app" which provides various functionalities.

Thus, in various aspects, the present disclosure provides an on-board vehicle system and method for camera or sensor-based parking spot detection and identification. This system and method utilizes a front (or side or rear) camera or sensor image to detect and identify one or more parking spots at a distance via vector representation using a deep neural network trained with data annotated using an annotation tool, without first transforming the camera or sensor image(s) to a BEV or the like. The system and method can be incorporated in a DA or AD system, providing the DA or AD system with its perception capability. The system and method can be integrated with conventional parking solutions, including proximity sensors and near-field BEV methodologies. Parking spot information can be cloud-shared as parking lots maps, etc. It can also be used by businesses and the like to assess capacity utilization, etc.

The vector representation of the present disclosure is a compact representation that is encoded with the position, size, and orientation of a detected parking spot or spots, as well as entrance direction and type identification (vacant, occupied, handicapped, emergency, loading zone, etc.). It will be readily apparent to those of ordinary skill in the art that such vector representation can be extended to other than parking spots equally.

The present disclosure has a number of exemplary applications. Related to driver assistance, long-range parking spot detection is provided in the form of user interface, augmented reality (UIAR). Related to autonomous driving, a vehicle can find vacant parking spots at a distance and find its way to the spots autonomously, then complete the parking process. Related to parking lot and garage mapping, with the large coverage enabled by the front camera or sensor, a vehicle equipped with this system can quickly map the parking spot configuration of a parking lot or garage, including the number of parking spots, parking type distribution (e.g. percentage of handicapped parking), floor layout, etc. Such information would prove valuable for mapping companies and the like. Related to the cloud sharing of parking information, for all vehicles with this system installed, they could upload the detected parking spots, either occupied or vacant, with relevant information, such as types of parking spots, positions, sizes, and orientations of parking spots, etc. Such information could be shared among all nearby vehicles to help them locate available parking spots. Such information would also be valuable for third-party applications that provide parking information. Related to business information collection, this system could quickly collect the usage rate of a parking lot or garage, and evaluate the business activity level based on the percentage of parked vehicles, type of parked vehicles, etc. The system could also be coupled with license plate detection in order to mine further detailed information. Such information would be valuable to consulting companies and the like.

Although the present disclosure is illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following non-limiting claims for all purposes.

What is claimed is:

1. A system, comprising:
   a camera or sensor operable for obtaining an image encompassing a defined space, wherein the camera or sensor comprises one or more of a front camera or sensor, a side camera or sensor, and a rear camera or sensor mounted on a vehicle, and wherein the image comprises one or more of a front image, a side image, and a rear image showing a corresponding view from the a vehicle; and
   a processor executing an algorithm operable for segmenting the defined space in the image and overlaying a directional representation connecting points associated with the defined space, wherein the directional representation comprises information related to one or more of a location, a size, and an orientation of the defined space, and wherein the directional representation comprises information related to a classification of the defined space.

2. The system of claim 1, wherein the camera or sensor comprises multiple of the front camera or sensor, the side camera or sensor and the rear camera or sensor, and wherein the image comprises multiple of the front image, the side image, and the rear image stitched together.

3. The system of claim 1, wherein the processor is disposed one of on-board the vehicle and remote from the vehicle in a network cloud.

4. The system of claim 1, wherein the algorithm is operable for executing a stage comprising one or more of an image pre-processing stage, a network operations stage, and a post-processing stage that comprises a decoding step that interprets output of the network operations stage and a non-maximum suppression step, and wherein the network comprises an artificial intelligence network trained using a plurality of training images that are annotated using an annotation tool.

5. The system of claim 4, wherein the annotation tool is operable for receiving selected points of interest on the plurality of images from an annotator, segmenting the training images based on the selected points of interest, annotating the plurality of training images, and saving the results as a j son file or the like, wherein the selected points of interest utilize one or more classes of markers, and wherein the plurality of training images are annotated using one or more classes of representations based on the one or more classes of markers.

6. The system of claim 1, wherein the algorithm utilizes a generative algorithm operable for modifying the directional representation such that it is consistent with surrounding directional representations generated from the image.

7. The system of claim 1, wherein the classification of the defined space comprises one or more of unoccupied, occupied, and defined space type.

8. The system of claim 1, further comprising a display operable for displaying the directional representation to a driver of the vehicle overlaid on one of the image and another image.

9. The system of claim 1, wherein the directional representation is one or more of: communicated to and used by one or more of a driver-assist system and an autonomous driving system of the vehicle to maneuver the vehicle into the defined space when the directional representation indicates that the defined space is unoccupied, communicated to a cloud network and shared with other vehicles, and used to generate a map of an area.

10. A method, comprising:
    obtaining an image encompassing a defined space using a camera or sensor, wherein the camera or sensor comprises one or more of a front camera or sensor, a side camera or sensor, and a rear camera or sensor mounted on a vehicle, and wherein the image comprises one or more of a front image, a side image, and a rear image showing a corresponding view from a vehicle; and
    segmenting the defined space in the image and overlaying a directional representation connecting points associated with the defined space using a processor executing an algorithm, wherein the directional representation comprises information related to one or more of a location, a size, and an orientation of the defined space, and wherein the directional representation comprises information related to a classification of the defined space.

11. The method of claim 10, wherein the camera or sensor comprises multiple of the front camera or sensor, the side camera or sensor and the rear camera or sensor, and wherein the image comprises multiple of the front image, the side image, and the rear image stitched together.

12. The method of claim 10, wherein the processor is disposed one of on-board the vehicle and remote from the vehicle in a network cloud.

13. The method of claim 10, wherein the algorithm is operable for executing a stage comprising one or more of an image pre-processing stage, a network operations stage, and a post-processing stage that comprises a decoding step that interprets output of the network operations stage and a non-maximum suppression step, and wherein the network comprises an artificial intelligence network trained using a plurality of training images that are annotated using an annotation tool.

14. The method of claim 13, wherein the annotation tool is operable for receiving selected points of interest on the plurality of images from an annotator, segmenting the training images based on the selected points of interest, annotating the plurality of training images, and saving the results as a j son file or the like, wherein the selected points of interest utilize one or more classes of markers, and wherein the plurality of training images are annotated using one or more classes of representations based on the one or more classes of markers.

15. The method of claim 10, wherein the algorithm utilizes a generative algorithm operable for modifying the directional representation such that it is consistent with surrounding directional representations generated from the image.

16. The method of claim 10, wherein the classification of the defined space comprises one or more of unoccupied, occupied, and defined space type.

17. The method of claim 10, further comprising displaying the directional representation to a driver of the vehicle overlaid on one of the image and another image using a display.

18. The method of claim 10, wherein the directional representation is one or more of: communicated to and used by one or more of a driver-assist system and an autonomous driving system of the vehicle to maneuver the vehicle into the defined space when the directional representation indicates that the defined space is unoccupied, communicated to a cloud network and shared with other vehicles, and used to generate a map of an area.

19. A vehicle, comprising:
a camera or sensor operable for obtaining an image encompassing a defined space, wherein the camera or sensor comprises one or more of a front camera or sensor, a side camera or sensor, and a rear camera or sensor mounted on the vehicle, and wherein the image comprises one or more of a front image, a side image, and a rear image showing a corresponding view from the vehicle;
one of an on-board processor and a communications link to a remote processor executing an algorithm operable for segmenting the defined space in the image and overlaying a directional representation connecting points associated with the defined space, wherein the directional representation comprises information related to one or more of a location, a size, and an orientation of the defined space, and wherein the directional representation comprises information related to a classification of the defined space; and
a display operable for displaying the directional representation to a driver of the vehicle overlaid on one of the image and another image.

20. The vehicle of claim 19, further comprising one or more of a driver-assist system and an autonomous driving system operable for receiving the directional representation and maneuvering the vehicle into the defined space when the directional representation indicates that the defined space is unoccupied.

* * * * *